US007945362B2

(12) United States Patent
Dobkin et al.

(10) Patent No.: US 7,945,362 B2
(45) Date of Patent: May 17, 2011

(54) APPARATUS AND METHOD FOR POWER HOP DETECTION AND MITIGATION

(75) Inventors: Eric Dobkin, Waterford, MI (US); Long Ying, Novi, MI (US); Derek Cleasby, Commerce, MI (US); Ron Posa, Commerce, MI (US)

(73) Assignee: Advics Co., Ltd., Kariya-Shi, Aichi-Ken (JP)

( * ) Notice: Subject to any disclaimer, the term of this patent is extended or adjusted under 35 U.S.C. 154(b) by 878 days.

(21) Appl. No.: 11/812,906

(22) Filed: Jun. 22, 2007

(65) Prior Publication Data

US 2008/0319623 A1 Dec. 25, 2008

(51) Int. Cl.
*B60G 17/018* (2006.01)
(52) U.S. Cl. ............... 701/37; 701/38; 701/50; 180/337
(58) Field of Classification Search ............. 701/37, 701/38, 50, 84; 180/337; 280/5.5
See application file for complete search history.

(56) References Cited

U.S. PATENT DOCUMENTS

| | | | | |
|---|---|---|---|---|
| 4,919,098 | A | | 4/1990 | Shimada et al. |
| 5,511,867 | A | * | 4/1996 | Luckevich et al. ............. 303/191 |
| 5,839,082 | A | * | 11/1998 | Iwasaki ............................ 701/38 |
| 5,979,885 | A | * | 11/1999 | Katsuda .................... 267/140.14 |
| 6,067,491 | A | * | 5/2000 | Takahashi ........................ 701/37 |
| 6,164,665 | A | * | 12/2000 | Lentz et al. ................. 280/5.503 |
| 6,401,853 | B1 | | 6/2002 | Turski et al. |
| 6,463,379 | B1 | * | 10/2002 | Kohler et al. .................... 701/84 |
| 6,729,698 | B2 | | 5/2004 | Kusano et al. |
| 6,910,746 | B2 | | 6/2005 | Kato et al. |
| 7,013,206 | B2 | * | 3/2006 | Stiller et al. ..................... 701/37 |
| 7,085,636 | B2 | * | 8/2006 | Song et al. ...................... 701/38 |
| 7,104,615 | B2 | | 9/2006 | Kato et al. |
| 7,333,882 | B2 | * | 2/2008 | Uchino et al. ................... 701/37 |
| 2002/0032508 | A1 | * | 3/2002 | Uchino et al. ................... 701/37 |
| 2003/0033883 | A1 | * | 2/2003 | Chen .............................. 73/649 |
| 2004/0041469 | A1 | * | 3/2004 | Ishikawa et al. .............. 303/139 |
| 2006/0009897 | A1 | * | 1/2006 | Schick et al. .................... 701/50 |
| 2007/0061059 | A1 | | 3/2007 | Inoue et al. |
| 2008/0243334 | A1 | * | 10/2008 | Bujak et al. ..................... 701/37 |

OTHER PUBLICATIONS

International Search Report issued in corresp. PCT/US2008/007679, Sep. 11, 2008, ISA, US, Alexandria, VA.

* cited by examiner

*Primary Examiner* — Mark Hellner
*Assistant Examiner* — Helal A Algahaim
(74) *Attorney, Agent, or Firm* — Buchanan Ingersoll & Rooney PC

(57) ABSTRACT

A method and system of detecting power hop of a vehicle involves generating signals, including a current signal and a previous signal, indicative of the current longitudinal acceleration of the vehicle, calculating the period and amplitude of the signals, determining if the combined period and amplitude of the current signal exceeds a first predetermined value, and determining whether the combined period and amplitude of the current signal exceeds a second predetermined value greater than the first predetermined value. The method may also involve determining if the amplitude of the current signal exceeds a predetermined percentage of the amplitude of the previous signal. Power hop is detected when the combined period and amplitude of the current signal exceeds the first predetermined value as well as the second predetermined value, and possibly also when the amplitude of the current signal exceeds the predetermined percentage of the amplitude of the previous signal.

7 Claims, 4 Drawing Sheets

US 7,945,362 B2

APPARATUS AND METHOD FOR POWER HOP DETECTION AND MITIGATION

TECHNOLOGICAL FIELD

Figure 1:
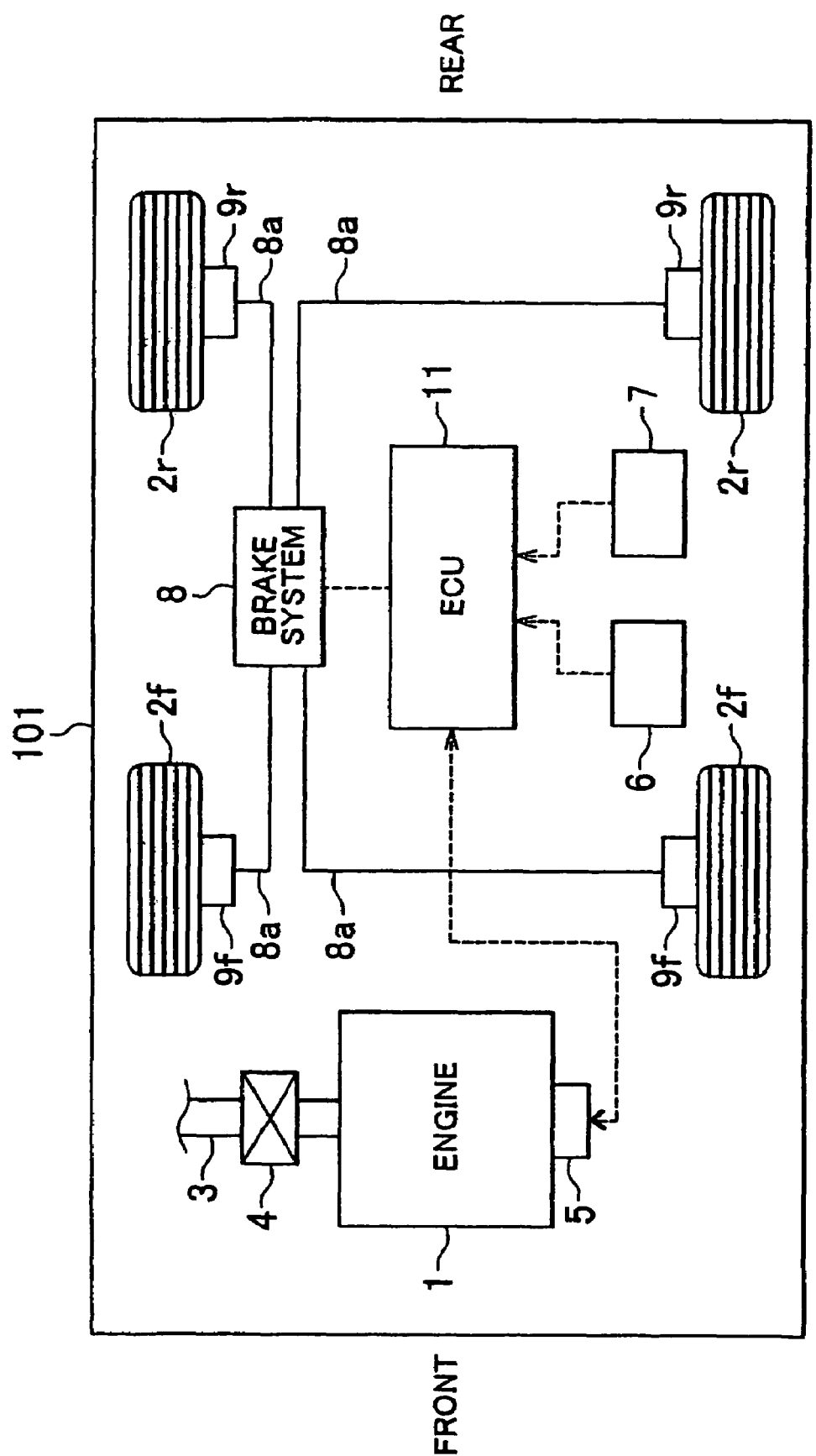

The present invention generally relates to an apparatus and method for detecting power hop of vehicles. The present invention also generally pertains to an apparatus and method for mitigating power hop of vehicles.

BACKGROUND DISCUSSION

Vehicles are maneuvered over a variety of different roads/terrains including, for example, off-road conditions. For instance, vehicles may sometimes encounter situations in which there is sufficient traction available for the tires to begin moving forward, but not sufficient traction to maintain forward movement (e.g., a dirt hole or a rock step). The tires will essentially grab and slip, creating a longitudinal oscillation. In vehicles that are more prone to power hop, for example, this longitudinal oscillation may be amplified by the driveline and suspension. In situations in which a vehicle experiences a longitudinal periodic oscillation, such as during off-road use, the vehicle may be damaged. For example, the drive train of the vehicle may experience damage. It would be desirable for a vehicle to be able to detect power hop situations as desired and/or appropriate (e.g., instances of power hop which might present the potential for damaging the vehicle). In addition, it would be desirable for a vehicle to be able to address such situations, such as through mitigation.

SUMMARY

According to one aspect of the disclosed embodiment, a method of detecting power hop of a vehicle comprises obtaining a plurality of successive signals indicative of a longitudinal acceleration of the vehicle, including a current signal and a preceding signal that precedes the current signal, calculating the period and an amplitude of the successive signals, determining if the combination of the period and amplitude of each of the successive signal exceeds a first predetermined value, determining if the combination of the period and amplitude of the current signal exceeds a second predetermined value that is greater than the first predetermined value, and determining existence of a power hop condition based on whether the combination of the period and amplitude of the current signal exceeds the first predetermined value, and whether the combination of the period and amplitude of the current signal exceeds the second predetermined value.

According aspect of the disclosure involves a method of mitigating power hop of a vehicle comprising determining if power hop exists, if power hop exists reducing the torque of the engine of the vehicle, and if power hop does not exist determining if a torque reduction of the engine has been previously performed or is currently being performed, and increasing the torque of the engine at a predetermined rate in response to depression of the accelerator pedal of the vehicle.

According to yet other aspects of the disclosure, a vehicle includes an engine and a controller configured to control the engine. The controller detects power hop of the vehicle and/or mitigates power hop of the vehicle.

BRIEF DESCRIPTION OF THE DRAWING FIGURES

Various embodiments of the present invention will be explained with reference to the attached drawing figures which are briefly described below.

FIG. 1 schematically depicts a vehicle implementing the subject matter disclosed herein.

Figure 2:
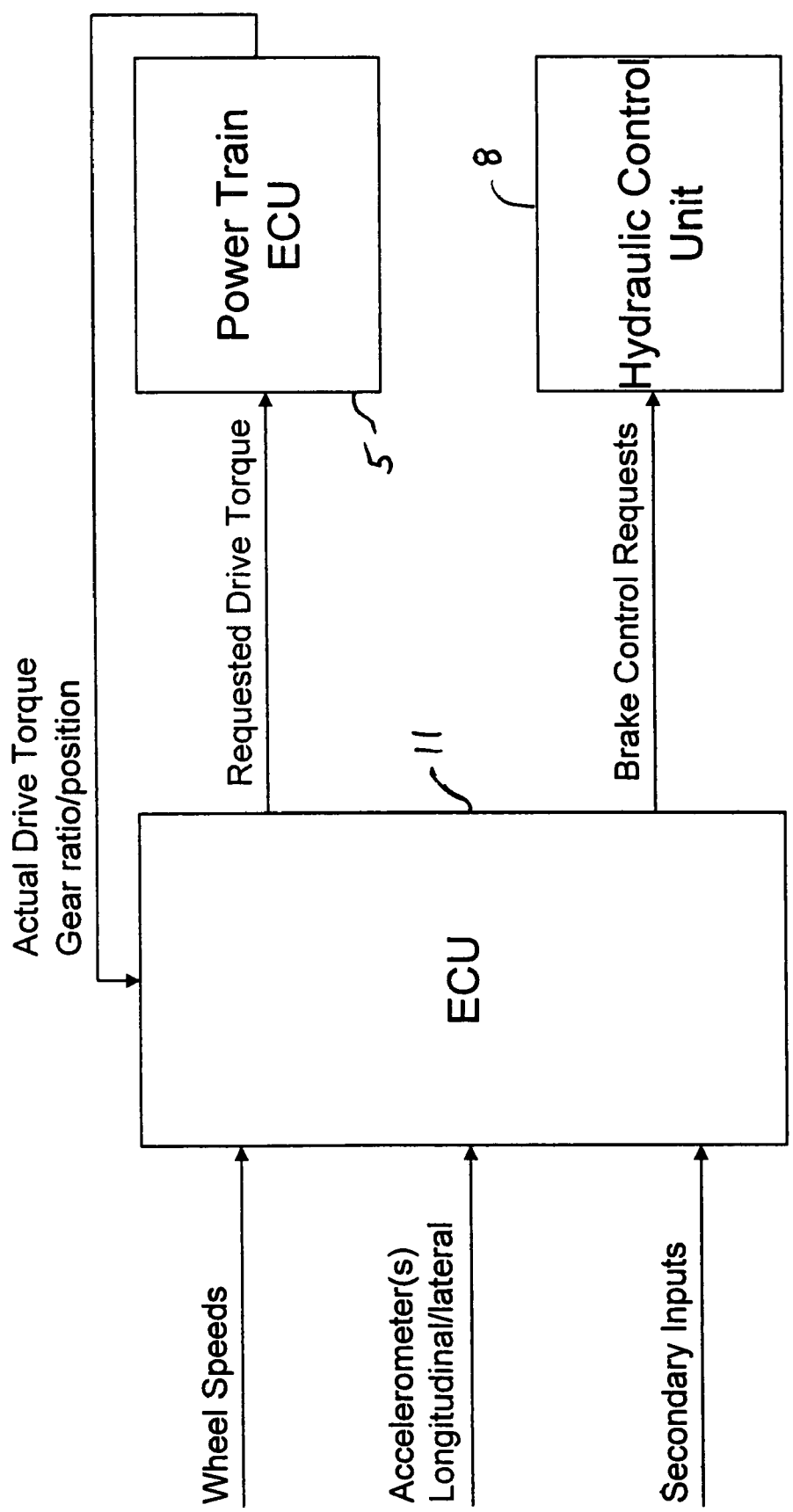

FIG. 2 schematically depicts a traction control system adaptable for use with the method and apparatus described herein.

Figure 3:
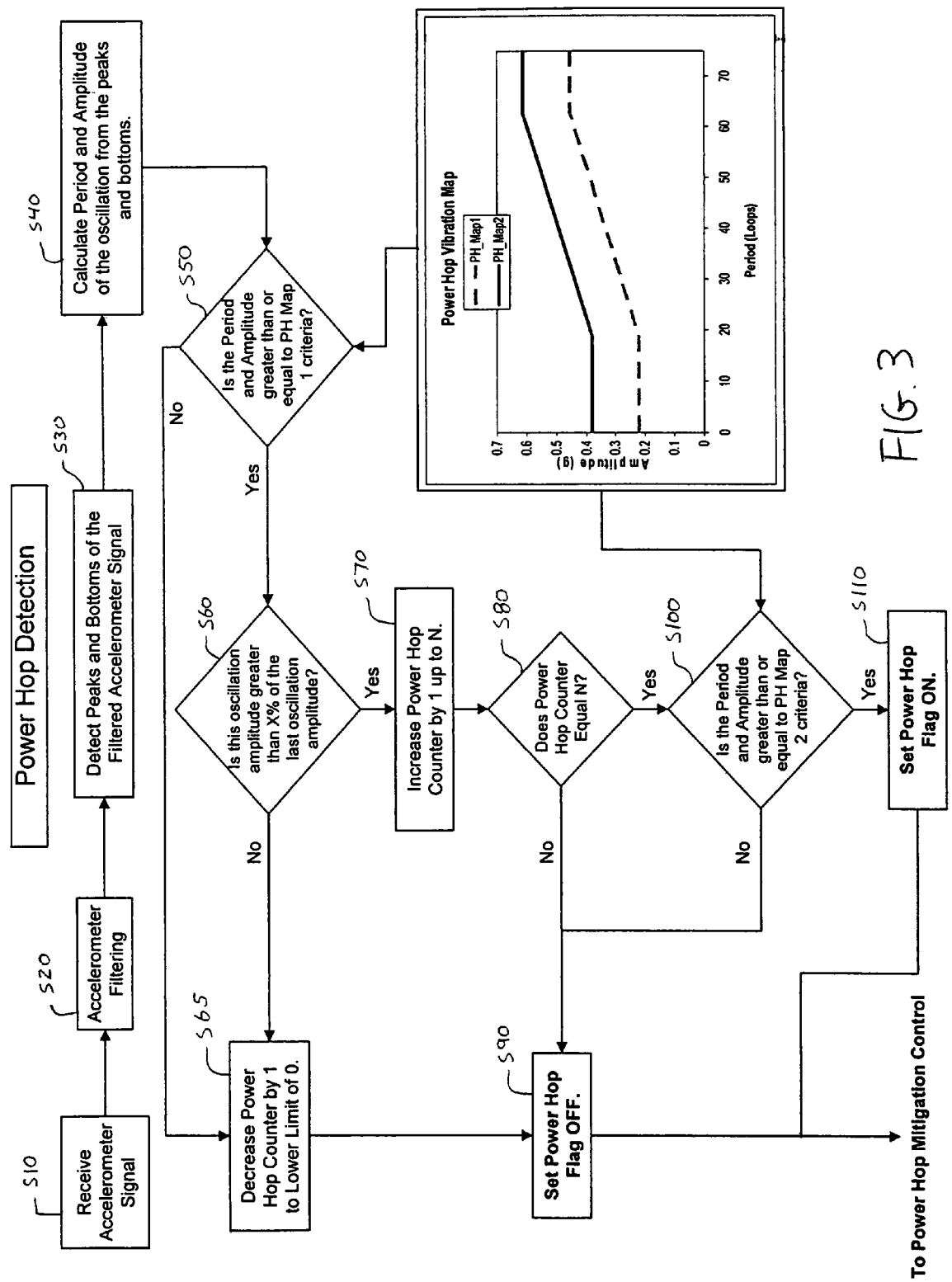

FIG. 3 schematically illustrates a process for detecting the occurrence of power hop.

Figure 4:
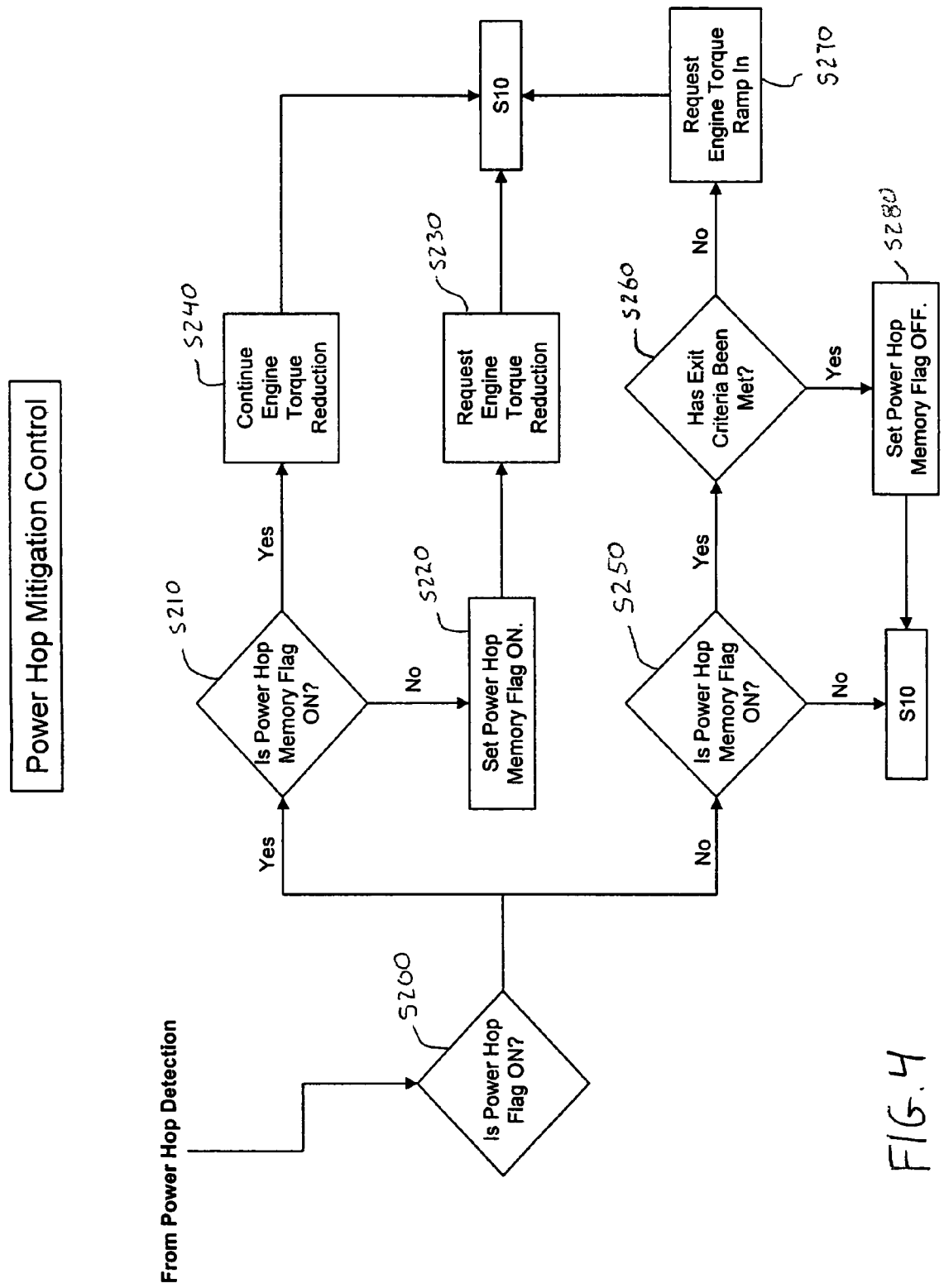

FIG. 4 schematically illustrates a process for mitigating power hop.

DETAILED DESCRIPTION

Referring to FIG. 1, a vehicle 101 includes an engine 1. The engine may be an internal combustion engine, and include an air intake 3 controlled by a throttle valve 4. However, it should be appreciated that the engine may be an electric motor, a hybrid system of an internal combustion engine and an electric motor, or a fuel cell.

The vehicle 101 includes wheels 2f, 2r that are braked by brakes 9f, 9r, respectively. A brake system hydraulic control unit 8 may be configured to control the operation of brakes 9f, 9r through hydraulic passages 8a. The control unit 8 may be configured to control the brake based on inputs from a brake pedal sensor and/or vehicle sensors 6, 7.

An electronic control unit (ECU) 11 receives input from the sensors 6, 7. The sensor 7 is a longitudinal acceleration sensor. The sensor 6 may be a vehicle speed sensor, a lateral acceleration sensor, and/or a yaw rate sensor(s). It should be appreciated that other sensors, such as wheel speed sensors, may also be provided.

The ECU 11 receives input from, and transmits commands to, a power train electronic control unit (ECU) 5. The power train ECU 5 may transmit drive torque and gear ratio/position information to the ECU 11. The ECU 11 may transmit engine torque commands to the power train ECU 5.

Referring to FIG. 2, a traction control system adaptable for use with the present invention includes the ECU 11, the power train ECU 5 and the brake system hydraulic control unit 8. Input from wheel speed sensors, the longitudinal accelerometer 7, a lateral accelerometer and secondary inputs (e.g. yaw rate sensor(s) and accelerator pedal sensor indicating operation of the accelerator pedal) are provided to the ECU 11. The ECU 11 includes a memory having stored therein a computer program for detecting and mitigating a power hop state of the vehicle. The ECU 11 may also receive information from the power train ECU 5, such as the actual drive torque and the gear ratio/position. The ECU 11 sends commands to the power train ECU 5 to provide a requested drive torque to the engine. The ECU 11 also sends brake control requests to the brake system hydraulic control unit 8 to activate the brakes 9f, 9r. The brake system hydraulic control unit 8 may be configured to control the braking force provided to each wheel 2f, 2r individually.

As discussed below, the detection of a power hop condition and the mitigation of such a power hop condition can be performed using the traction control system shown in FIG. 2, and using only the input of the longitudinal accelerometer 7 to the ECU and the drive torque request from the ECU 11 to the power train ECU 5.

FIG. 3 illustrates the power hop detection process. The process may begin upon the starting of the vehicle. However, it should also be appreciated that the process may be selectively started by a driver or passenger of the vehicle. For example, the power hop detection and mitigation system and method disclosed here is usable in a vehicle which is switchable between two-wheel drive and four-wheel drive through operation of an appropriate switch or the like. In such a case, the power hop detection and mitigation process would begin operation when the vehicle is switched to the four-wheel drive mode. As an alternative, the process may be started by activating a switch when the vehicle is to be driven in an off-road environment.

The power hop detection process begins at S10 where a signal from the longitudinal accelerometer 7 is received by the ECU 11. The process then proceeds to S20 wherein the accelerometer signal is filtered according to a conventional process. Next, at S30, the peaks and bottoms of the filtered accelerometer signal are detected and the process proceeds to S40 where the period and amplitude of the filtered signal is calculated. The period and amplitude can be calculated based on the oscillation half-cycle.

At S50, a decision is made as to whether a point representing the combination of the period and amplitude exceed a first power hop value PH_Map1 stored in a power hop vibration map shown in FIG. 3. The power hop vibration map may be stored in a memory of the ECU 11. It should be appreciated that the values shown in the power hop vibration map in FIG. 3 are examples and the power hop values may be other than those shown.

If the point indicated by the combination of the period and amplitude of the current accelerometer signal (e.g., oscillation half-signal) is found to exceed the first power hop value PH_Map1 in S50, the process proceeds to S60 where it is determined if the amplitude of the filtered accelerometer signal is greater than a predetermined percentage X % of the amplitude of the last (immediately preceding) accelerometer signal. The predetermined percentage is dependent on the vehicle. For example, the predetermined percentage may be 80%. This determination at S60 thus compares the amplitude of the current accelerometer signal to the amplitude of the last accelerometer signal to determine the relationship between the two. If the amplitude of the current signal is greater than the predetermined percentage of the amplitude of the previous accelerometer signal, the system determines that the conditions may be indicative of a power hop condition that might need to be mitigated, and the process thus proceeds to S70 where a power hop counter is increased by 1. The power hop detection process then proceeds to S80 where the value of the counter is checked to determine if the counter value is equal to a predetermined value N, where N is a non-zero positive integer. As an example, the predetermined value of the counter may be 4. However, it should be appreciated that the value is dependent on the particular vehicle and the predetermined counter value may be any other non-zero positive integer. It is to be noted that the power hop counter is incremented at S70 up to a maximum of N.

If the counter value is not equal to the predetermined counter value N, (i.e., a NO determination is made at S80), the power hop detection process proceeds to S90 where a power hop flag is set to OFF. The power hop flag is a flag used to indicate whether power hop for the current cycle is detected. From S90, the routine proceeds to power hop mitigation control, the details of which are shown in FIG. 4 and described in more detail below.

A YES determination at S80 indicates that the combination of the period and amplitude of a N number of successive filtered accelerometer signals have exceeded the first power hop value PH_Map1, and the amplitude of each one of the N successive oscillation signals has been greater than X % of the previous oscillation signal. That is, by virtue of S80, the system is able to identify situations in which the vehicle is operated in an environment that results in a relatively short duration spike in the amplitude of the oscillation (e.g., the vehicle encounters a bump or rut in the road). Such an occurrence is not one which necessitates mitigation and so the disclosed embodiment of the system is constructed to identify such situations so that power hop mitigation control is not implemented.

If the power hop counter value equals the predetermined value N (i.e., the determination at S80 is Yes), the process proceeds to S100. In S100, it is determined whether the point represented by the combination of the period and amplitude of the filtered accelerometer signal exceeds a second predetermined power hop value PH_Map2 obtained from the power hop vibration map shown in FIG. 3. As illustrated, the second predetermined power hop value PH_Map2 is greater than the first predetermined power hop value PH_Map1. If the combination of the period and amplitude does not exceed the second predetermined power hop value PH_Map2 (S100: No), the power hop detection process proceeds to S90 at which the power hop flag is set to OFF. Thereafter, the routine proceeds to the power hop mitigation control shown in FIG. 4. On the other hand, if the combination of the period and amplitude exceeds the second predetermined power hop vibration value PH_Map2 (S100:Yes), the process proceeds to S110 where the power hop flag is set to ON. The routine then proceeds to the power hop mitigation control of FIG. 4.

The system and method described here utilize the first predetermined power hop value PH_Map1 to identify situations where the vehicle may be approaching a power hop situation that may require mitigation. Thus, if several successive (e.g., N successive) filtered accelerometer signals are greater than the first predetermined power hop value PH_Map1, the system determines that the vehicle is likely approaching a power hop condition that will benefit from power hop mitigation. Upon detecting several successive filtered oscillation signals greater than the first predetermined power hop value PH_Map1, the system is prepared to identify, preferably immediately, that a power hop condition exists when the combined period and amplitude of the next oscillation signal exceeds the second predetermined power hop value PH_Map2.

Referring again to S50, if it is determined that the combination of the period and amplitude of the filtered accelerometer signal in the current cycle does not exceed the first predetermined power hop vibration value PH_Map1, the power hop detection process proceeds to S65 where the power hop counter is decreased by 1 (to a lower limit of zero). Similarly, if it is determined at S60 that the amplitude of the filtered oscillation or accelerometer signal in the current cycle is not greater than the predetermined percentage X % of the last (immediately preceding) filtered accelerometer or oscillation signal (S60:No), the power hop detection process proceeds to S65 where the power hop counter is decreased by 1. From S65, the process proceeds to S90 where the power hop flag is set to OFF. The power hop detection process may then proceed to the power hop mitigation control in FIG. 4.

FIG. 4 illustrates details of the power hop mitigation control. The power hop mitigation control begins at S200 where it is determined whether the power hop flag is ON. If the power hop flag is ON, the power hop mitigation control proceeds to S210 where it is examined whether a power hop memory flag is ON. In the illustrated embodiment, the power hop memory flag (e.g., stored in the ECU 11) is ON when the system is currently implementing power hop mitigation (i.e., engine torque reduction is being performed in response to a power hop detection), and is OFF when the system is not currently implementing power hop mitigation.

If the power hop memory flag at S210 is not ON (i.e., power hop mitigation is not currently being performed), the routine proceeds to S220 where the power hop memory flag is set to ON. Then, the power hop mitigation process proceeds to S230 and the ECU 11 sends a command to the power train ECU 5 to automatically reduce the engine torque to reduce the severity of the power hop. The routine then returns to S10.

At S210, if the examination indicates that the power hop memory flag is ON (i.e., power hop mitigation is currently being performed), the routine proceeds to S240 where engine torque reduction continues, followed by a return to S10.

If, at S200, the power hop flag is not ON, the process proceeds to S250 where it is examined whether the power hop memory flag is ON. If it is found at S250 that the power hop memory flag is not ON, the routine returns to S10. On the other hand, if it is found at S250 that the power hop memory flag is ON, the process proceeds to S260 where a determination is made regarding whether exit criteria have been met. In the disclosed embodiment, the exit criteria is exit criteria for traction control. For example. if it is determined that the accelerator pedal is not depressed, it is determined that the exit criteria have been met. On the other hand, if the accelerator pedal is depressed, the exit criteria can involve determining that the driver's requested torque (associated with the depression of the accelerator pedal), implemented in accordance with the engine torque ramp-in described below, has been met.

If the determination at S260 is YES (i.e., the exit criteria have been met), the process proceeds to S280 where the power hop memory flag is set to OFF, and the routine then returns to S10. If the determination at S260 is NO (i.e., the exit criteria have not been met), the process proceeds to S270 at which the ECU 11 transmits a command to the power train ECU 5 to request engine torque ramp-in if the accelerator pedal is depressed. As the engine torque is reduced to a set level by the power hop mitigation process, the longitudinal oscillations decrease. At S270, the ECU 11 controls the power train ECU 5 so that the engine torque is ramped back in, preferably at a set rate, to thus inhibit or prevent the engine torque from being increased in a manner that might initiate start of another power hop. As the engine torque ramp-in is being carried out at S270, the driver can fully depress the accelerator pedal, but the engine torque will increase at the set ramp-in rate. Following S270, the process proceeds back to S10. If at any time the driver releases the accelerator pedal during the power hop mitigation routine, the power hop mitigation routine will be reset.

The embodiment of the power hop detection process and system described herein allows for detection of a wider range of power hop frequencies and amplitudes without mis-detecting situations that do not require power hop mitigation. Longitudinal oscillations which may be of concern from the standpoint of potential damage to the vehicle include those exhibiting certain characteristics (e.g., a certain combination of period/amplitude). In the disclosed embodiment, longitudinal oscillations which may be of concern are those exhibiting certain combinations of period/amplitude (the second power hop value PH_Map2 in FIG. 3). In the disclosed embodiment, the system first determines whether the longitudinal oscillations (combination of period/amplitude) experienced by the vehicle exceed a threshold lower than the second power hop value PH_Map2, thus providing an indication that the vehicle may be approaching a situation requiring power hop mitigation. In the embodiment described here, the lower threshold is represented by the first power hop value PH_Map1 illustrated by way of example in FIG. 3. Upon detecting such a condition, the system is able to implement power hop mitigation, preferably immediately, when the longitudinal oscillations (combination of period/amplitude) experienced by the vehicle exceed the second power hop value PH_Map2. In this way, the occurrence of a relatively short-term occurrence of longitudinal oscillations (combination of period/amplitude) exceeding the second power hop value PH_Map2, such as might occur if the vehicle encounters a bump or the like, does not result in implementation of power hop mitigation. In addition, the use of the longitudinal accelerometer signal eliminates the necessity of detecting the power hop condition using less reliable methods, such as those using wheel speed sensors.

Referring to the power hop vibration map shown in FIG. 3, the embodiment of the power hop detection routine disclosed here determines the period (frequency) and amplitude of the longitudinal oscillations. In general, the greater the frequency and/or amplitude of the oscillations, the more likely it is that damage will result to the vehicle. The combination of frequency and amplitude determines how much energy is applied to the vehicle during the longitudinal oscillations. For example, a high frequency with a relatively low amplitude oscillation may be just as severe as a situation involving high amplitude with a relatively low frequency oscillation. The power hop detection routine here uses the relationship between the frequency and amplitude (i.e., the combination of the period and amplitude) to detect situations that could cause vehicle damage. Other situations are preferably disregarded from the standpoint of actively implementing power hop mitigation through engine torque reduction.

The system and method described here has useful application in any brake control software that is configured to request engine torque reduction and utilizes a longitudinal accelerometer. As discussed with respect to FIG. 2, the disclosed system and method may be utilized in a traction control system. It should be appreciated, however, that the disclosed system and method may also be used in any anti-lock braking system (ABS) or electronic stability control (ESC) system. It should also be appreciated that the system and method may be used separate from any braking, traction or stability control system.

Although the disclosed method and system are described with reference to the preferred embodiment disclosed herein, it should be appreciated that various modifications will be apparent to those of ordinary skill in the art without departing from the spirit and scope of the invention as defined in the following claims.

What is claimed is:

1. A method of detecting power hop of a vehicle, comprising:
   obtaining a plurality of successive signals indicative of a longitudinal acceleration of the vehicle, including a current signal and a preceding signal that precedes the current signal, the vehicle including an engine connected to an electronic control unit, the electronic control unit controlling engine torque produced by the engine;
   calculating a period and an amplitude of the successive signals;
   determining if a combination of the period and amplitude of each of the successive signals exceeds a first predetermined value;
   determining if the combination of the period and amplitude of the current signal exceeds a second predetermined value that is greater than the first predetermined value;
   determining existence of a power hop condition when both the combination of the period and amplitude of the current signal exceeds the first predetermined value, and the combination of the period and amplitude of the current signal exceeds the second predetermined value; and reducing the engine torque of the engine through control by the electronic control unit when the power hop condition is determined to exist.

2. A method according to claim 1, further comprising determining if the amplitude of the current signal exceeds a predetermined percentage of the amplitude of the preceding signal, and determining the existence of the power hop condition when the amplitude of the current signal exceeds the predetermined percentage of the amplitude of the preceding signal.

3. A method according to claim 2, further comprising determining if the amplitude of the current signal exceeds the predetermined percentage of the amplitude of the preceding signal a predetermined number of times, the predetermined number of times being more than one.

4. A method according to claim 3, wherein power hop is determined to exist when: i) the combination of the period and amplitude of the current signal exceeds the first predetermined value at least the predetermined number of times; ii) the amplitude of the current signal exceeds the predetermined percentage of the preceding signal at least the predetermined number of times; and iii) the combination of the period and amplitude of the current signal exceeds the second predetermined value.

5. A method according to claim 1, wherein power hop is determined to exist when the combination of the period and amplitude of the current signal exceeds the first predetermined value and when the combination of the period and amplitude of the current signal exceeds the second predetermined value.

6. A method according to claim 2, wherein power hop is determined not to exist when the combination of the period and amplitude of the current signal does not exceed the first predetermined value and when the amplitude of the current signal does not exceed the predetermined percentage of the amplitude of the preceding signal.

7. A method according to claim 1, wherein power hop is determined not to exist when the combination of the period and amplitude of the current signal does not exceed the first predetermined value and when the amplitude of the current signal does not exceed the predetermined percentage of the amplitude of the preceding signal.

* * * * *